(12) United States Patent
Ota

(10) Patent No.: US 6,328,241 B1
(45) Date of Patent: Dec. 11, 2001

(54) VTR CASSETTE TAPE

(75) Inventor: Shunsaku Ota, Tokyo (JP)

(73) Assignees: Ace Premium Co., Ltd.; Fuji Television Network Incorporated, both of Tokyo (JP)

( * ) Notice: Subject to any disclaimer, the term of this patent is extended or adjusted under 35 U.S.C. 154(b) by 0 days.

(21) Appl. No.: 09/441,208

(22) Filed: Nov. 16, 1999

(30) Foreign Application Priority Data

Jan. 14, 1999 (JP) .................................................. 11-008565

(51) Int. Cl.[7] ..................................................... G11B 23/04
(52) U.S. Cl. ........................ 242/347.1; 242/347; 360/132
(58) Field of Search ............................... 242/347.1, 347; 360/132

(56) References Cited

U.S. PATENT DOCUMENTS

| Re. 33,872 | * | 4/1992 | Koken et al. | ................. | 242/347.1 X |
| 5,294,072 | * | 3/1994 | East et al. | ..................... | 242/347.1 X |
| 6,136,277 | * | 10/2000 | Nardini | ............................. | 360/132 X |

FOREIGN PATENT DOCUMENTS

| 11-25639 | 1/1999 | (JP) . |
| 11-260024 | 9/1999 | (JP) . |

* cited by examiner

Primary Examiner—Donald P. Walsh
Assistant Examiner—Minh-Chau Pham
(74) Attorney, Agent, or Firm—Jacobson Holman, PLLC

(57) ABSTRACT

For a VTR cassette tape having an accommodation section for a small article, the present invention attempts to provide an efficient configuration for a cover for the small article accommodation section and to ensure that the cover can be opened and closed appropriately, thus, wherein an accommodation section 17 for a small article M is shaped like a recess and set in the top surface on a rear surface end of the cassette body 10, a cover 20 allowing the external shape of a cassette body 10 comprising an upper and a lower part to remain almost the same as the original shape encloses the accommodation section, the cover 20 being journaled into the upper part 10a of the cassette body 10 so as to open the accommodation section 17 when rotated upward, and a hook section 23 detachably hooks the cover 20 to the lower part 10b of the cassette body so as to rotate the cover 20 downward and to maintain the closed state.

3 Claims, 6 Drawing Sheets

VTR CASSETTE TAPE

FIELD OF THE INVENTION

The present invention relates to a cassette tape for a Video Tape Recorder (VTR) wherein an accommodation section for accommodating a small article is provided on the smaller-diameter reel side within a cassette body consisting of an upper and a lower part.

BACKGROUND OF THE INVENTION

VTR cassette tapes are used for such applications as sales promotion and product demonstration, and some tapes used for such applications are much shorter than general commercially-available recording and reproduction tapes such as 30- and 60-minute tapes. Thus, the inventor invented and applied for a cassette tape wherein the diameter of a reel is reduced for shorter tapes to form an extra space inside the cassette body, in which a section for accommodating a small article is provided (Japanese Patent Application No. 9-194973).

This conventional invention of a cassette tape has a structure wherein a recess section is provided in the top surface of the cassette body to accommodated a small article in the recess section, and wherein the recess section is closed by a cover. The inventor also improved this structure in which a small article is accommodated in the cassette body, in order to develop and apply for an invention wherein an opening in the accommodation section can be opened and closed (Japanese Patent Application No. 10-82987).

According to the latter invention, however, the cover is journaled into the body via a single vertical shaft so as to be laterally opened and closed, and is pushed back to a closed position by a spring. Thus, something may be caught in the tape to prevent the cover from being completely closed, and in this case, the cassette tape cannot be inserted in a video tape recorder. In addition, this invention requires the spring that pushes the cover and an engagement means having a complicated structure for closing the cover, thereby increasing the number of required parts and assembly steps. These are the problems with this invention.

DISCLOSURE OF THE INVENTION

The present invention has been provided in view of these points, and its object is to provide an efficient configuration to facilitate manufacture and to solve the operational problems to improve practicality and usability. Another object of the present invention is to provide a VTR tape that is effective in further activating business activities such as sales promotion.

These and other objects have been attained by a VTR cassette tape wherein the accommodation section for accommodating a small article therein is shaped like a recess and set at an end on a rear surface relative to a front surface from which a tape between the reels can be exposed, wherein a cover enclosing the accommodation section allows the external shape of the cassette body comprising the upper and lower parts to remain almost the same as the original shape, the cover being journaled into the upper part of the cassette body so as to open the accommodation section when rotated upward, and w herein a hook section detachably hooks the cover to the lower part of the cassette body so as to rotate and close the cover and to maintain that state.

BEST MODES FOR IMPLEMENTING THE INVENTION

Figure 1:
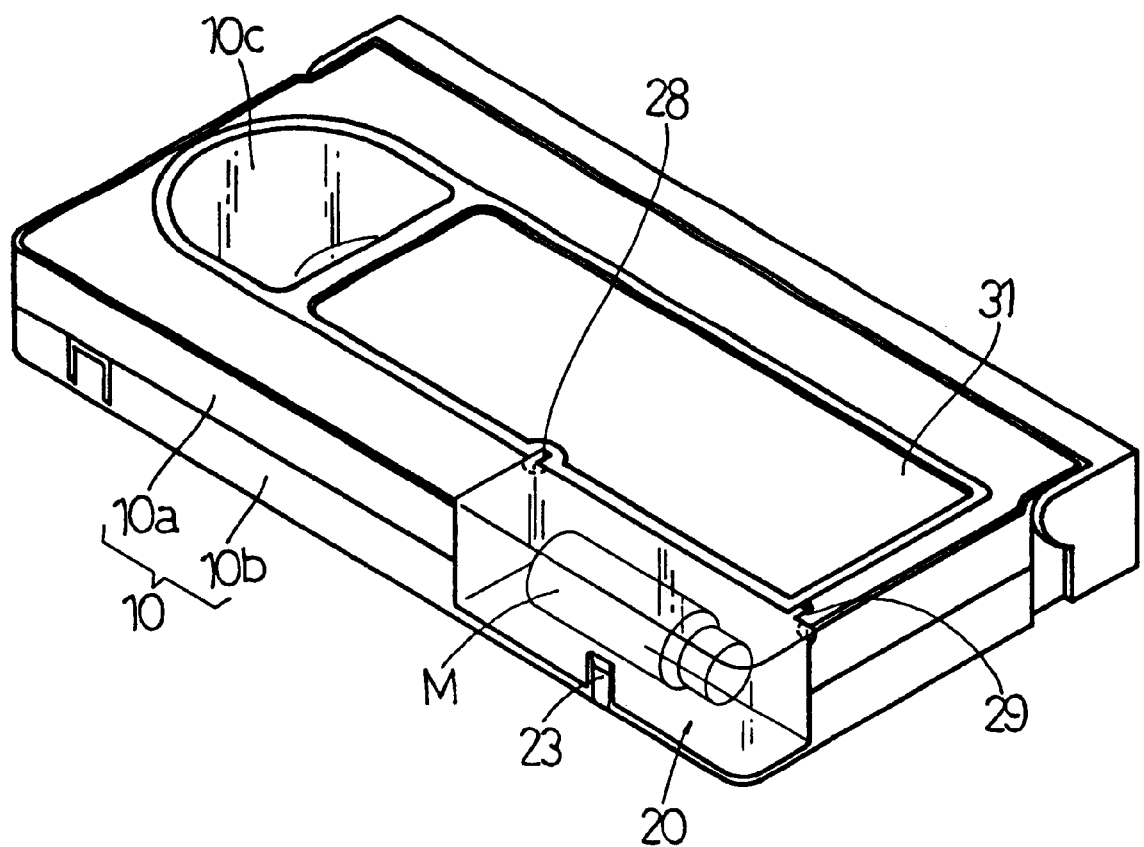
FIG. 1 is a perspective view showing an embodiment of a cassette tape according to the present invention.

A VTR cassette tape according to the present invention comprises a cassette body consisting of an upper and a lower part, wherein an accommodation section for accommodating a small article therein is provided on a smaller-diameter reel side on which the reel has a reduced diameter so as to correspond to a smaller tape length. The shorter tape, as used herein, refers to a tape having a recording time of less than 30 minutes, in particular, several minutes to less than 20 minutes.

Since the VTR cassette tape is inserted in a video tape recorder in such a way that a tape observation window faces upward and that the tape maintains a horizontal position, the present invention determines the top or bottom of the cassette body based on this position. In addition, only one circumferential surface of the cassette body can be opened to expose the tape for recording or reproduction, and the present invention refers to this surface as a "front surface" for convenience.

When this surface is assumed to be the front surface, a recess accommodation section for accommodating a small article therein is set in the top surface of an end on a side corresponding to the rear surface. If the VTR cassette tape is likened to a book, the side from which the pages open corresponds to the front surface, while the side to which the pages are bound corresponds to the back (spine). The accommodation section can be set at the left or right end of the rear surface, but is set in the top surface of the right end of the rear surface if a claw recess section for preventing re-recording must be provided in the left. The recess accommodation section is enclosed by a wall that closes the cassette body relative to the exterior.

The recess accommodation section can be connected with the exterior through the rear and top surfaces and side of the cassette body. The accommodation section uses the cover to allow the external shape of the cassette body consisting of the upper and lower parts to remain almost the same as the original shape. That is, the cover encloses the recess accommodation section and is composed of surfaces corresponding to the rear and top surfaces and side constituting part of the external shape of the cassette body, When rotated upward, the cover opens the accommodation section. Thus, the cover is journaled into the upper part of the cassette body. Accordingly, the cover is adapted to rotate around a horizontal axis so as to be opened or closed in the vertical direction. In addition, to rotate the cover downward from an open position to maintain the closed state, the hook section detachably hooks the cover to the lower part of the cassette body.

Thus, since the cover for the accommodation section is journaled into the upper part of the cassette body and is hooked to the lower part of the cassette body, it extends from the upper part to the lower part to enable the accommodation section of the cassette body to be reliably closed. The cover can also be integrated with the cassette body. In addition, although the cover can be closed by being pressed, this operation direction agrees with a direction in which the cassette tape is set in a video tape recorder, thereby preventing the series of operations from being affected.

EMBODIMENTS

The present invention is described below with reference to the illustrated embodiment. First, two tape reels 11, 12 are rotatably integrated into the respective boss sections of a cassette body 10.

The illustrated cassette body 10 consists of an upper part 10a having a transparent window 10c and a lower part 10b having shaft holes that fit in the respective reels 11, 12. Each part 10a, 10b of the body can be manufactured of a molded resin or by other means, but the bottom surface of the lower part 10b must have a specified shape and structure required for the VTR tape cassette.

Figure 2:
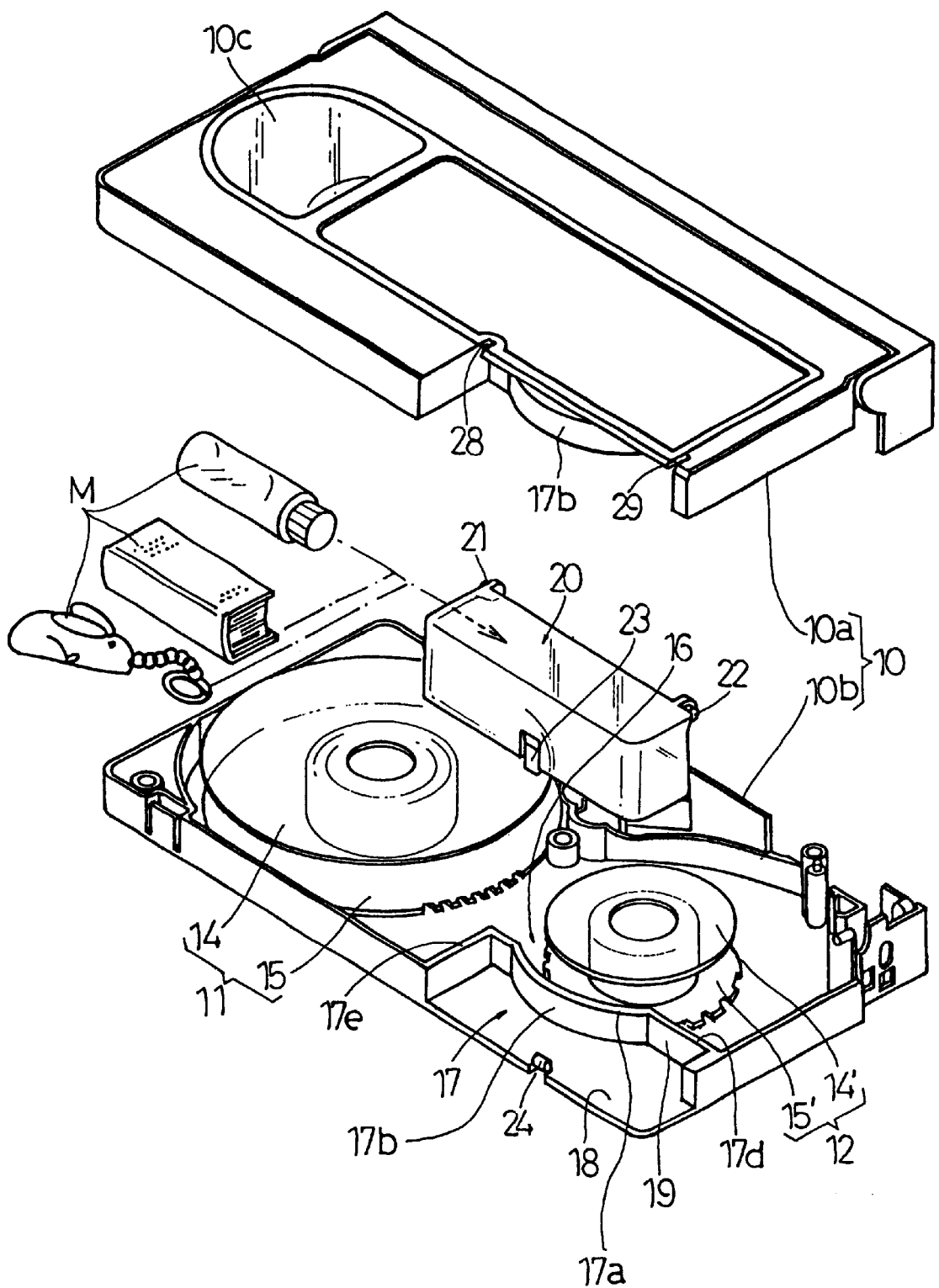
FIG. 2 i s an exploded perspective view of FIG. 1.

The tape reels 11, 12 have a pair of reel flanges 14, 15 of a diameter with which a required length of tape can be wound around the reel. The cassette tape according to the present invention uses a tape 13 shorter than the longest standard tape. The reel has such a diameter as does not affect the winding of, for example, a 20-minute tape 13. See FIGS. 1 and 2. The diameter is reduced for both the upper and lower reel flanges of the tape reel. These reel flanges of a reduced diameter are shown with a dash as 14' and 15'.

The reduced diameter of the reel flanges 14' and 15' results in a space 16 inside the cassette body 10. Thus, the present invention uses this space 16 as an accommodation section 17 for an small article M. The space 16 is between the reel 12 of a reduced diameter and a wall surface located externally of the reel 12.

The illustrated accommodation section 17 is a recess section provided in the cassette body 10 to accommodate the small article M that is introduced from the exterior. In the illustrated embodiment, two circumferential surfaces and a top surface corresponding to the right of the rear surface of the upper part 10a of the body are cut off, whereas only two circumferential surfaces at the same end of the lower part 10b of the body are cut off, with a bottom surface 18 remaining uncut. The accommodation section 17 is enclosed by a wall surface 19 to shield the inside of the cassette body, and can be opened and closed by a cover 20 that is attached outside the accommodation section 17. The cover 20 encloses the accommodation section 17 to generally maintain the original shape of the cassette body 10 in order to allow the body to be inserted into and removed from a VTR. The accommodation section 17 can be provided simultaneously with molding of the upper and lower parts 10a, 10b of the cassette body 10 using a resin.

The cover 20 is journaled into the upper part 10a of the cassette body 10 by a pair of support shafts 21, 22, and when rotated around these shafts, enables the small article M to be housed in or removed from the accommodation section 17. The cover 20 has a top surface section 20a that covers the top surface of the accommodation section 17; a rear surface section 20b that covers the rear surface; and a side section 20c that covers the right side, so the front and bottom surfaces and left side are open. The right and left support shafts 21, 22 are provided laterally of short arms 21a, 22a protruding from the cover 20 toward the front surface, and are fitted in and attached to bearing sections 21b, 22b provided on the right and left of the accommodation section 17. The cover 20 is formed of a transparent resin so that the small article M housed in the accommodation section 17 can be externally observed. See FIGS. 4 to 7.

Figure 8:
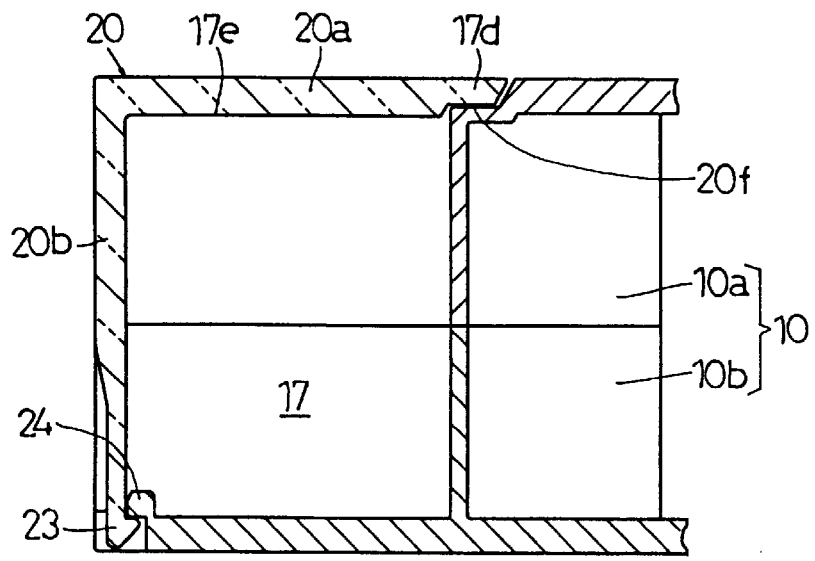
FIG. 8 is a sectional view taken along line VIII—VIII in FIG. 3.
Figure 9:
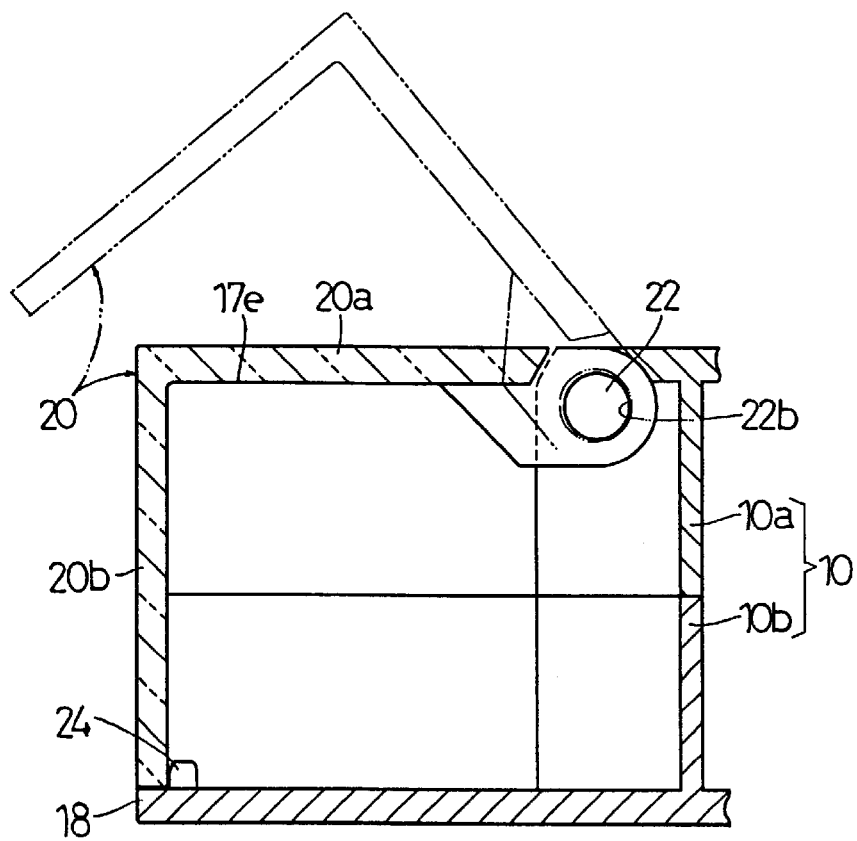
FIG. 9 is a sectional view taken along line IX—IX in FIG. 3.

The bottom of the cover 20 can be contacted with and supported by the bottom surface 18 of the cassette body 10. In addition, an inner edge 20d and an inside edge 20e can be engaged with an upper inside end 17d and an upper left end 17e, respectively (see FIGS. 8 and 2). The outside of the small-diameter reel 12 is blocked by an inner wall 17a of the accommodation section, and an escape section 20f is provided in the inner edge 20d of the cover 20 to avoid contact with a bulged section 17b of the inner wall 17a and to enable engagement with the cover 20. These engagement configurations of the cover 20 allow the cover 20 to be firmly combined with the cassette body 10 so that the cassette will not be damaged or disassembled even if it is pushed hard.

Furthermore, a hook section 23 is provided on the cover 20 and can be detachably hooked to an opposed section 24 of the cassette body 10. On the contrary, the hook 23 may be provided on the cassette body, while the opposed section 24 may be provided on the cover. In either case, however, hooking between the hook section 23 and the opposed section 24 is carried out in the lower part 10b of the cassette body 10, while the cover 20 is journaled into the upper part 10a, so when the cover 20 is closed for hooking, it couples the upper part 10a and the lower part 10b together.

By providing the accommodation section 17 in the corner (the end of the rear surface) of the cassette body 10, the following characteristics can be obtained: the space resulting from the reduced diameter of the reel can be fully utilized, and the cover 20 has a three-dimensional shape consisting of three surfaces as described above, so it can be used to accommodate the small article M therein and has increased strength as compared to a plate structure.

Figure 3:
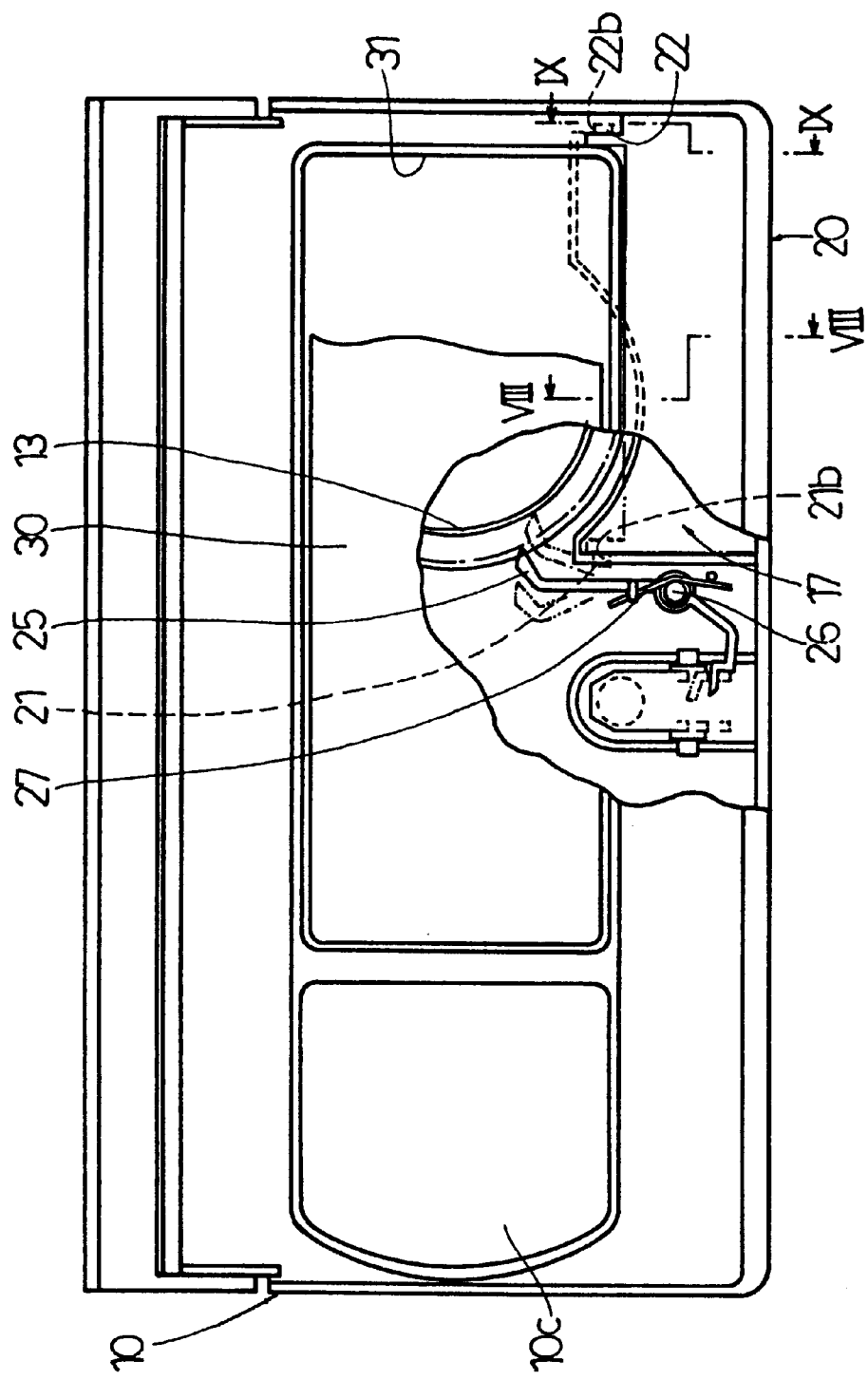
FIG. 3 is a partly broken top view of FIG. 1.
Figure 4:
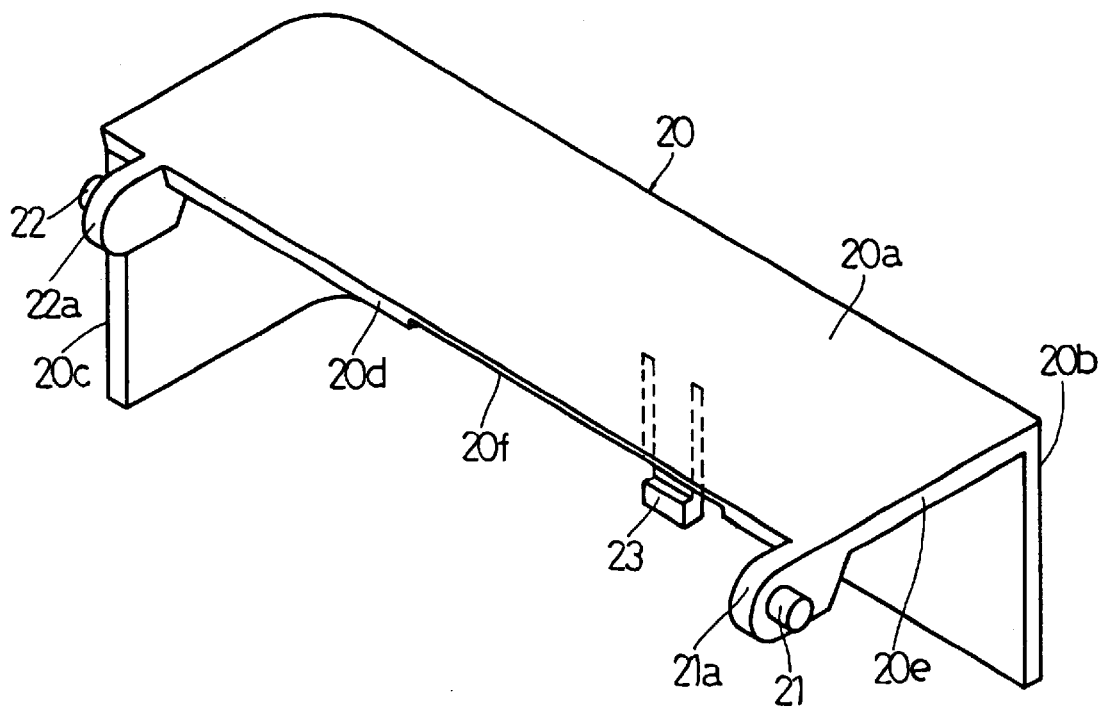
FIG. 4 is a perspective view of a cover.
Figure 5:
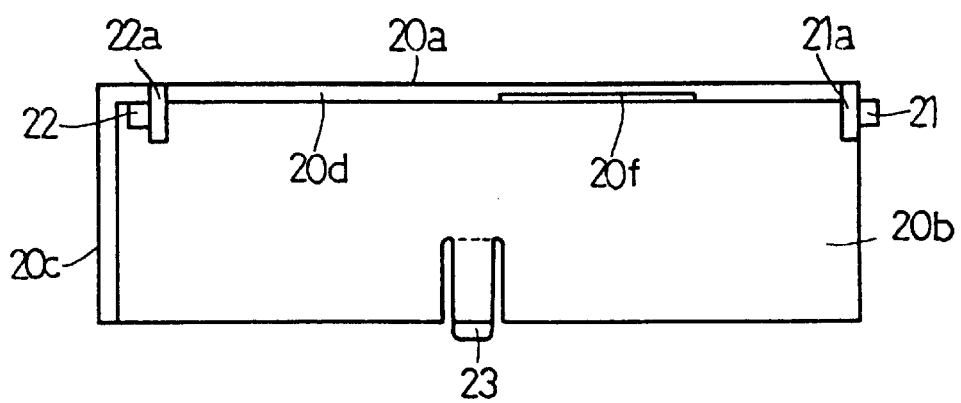
FIG. 5 is an internal view of the cover.
Figure 6:
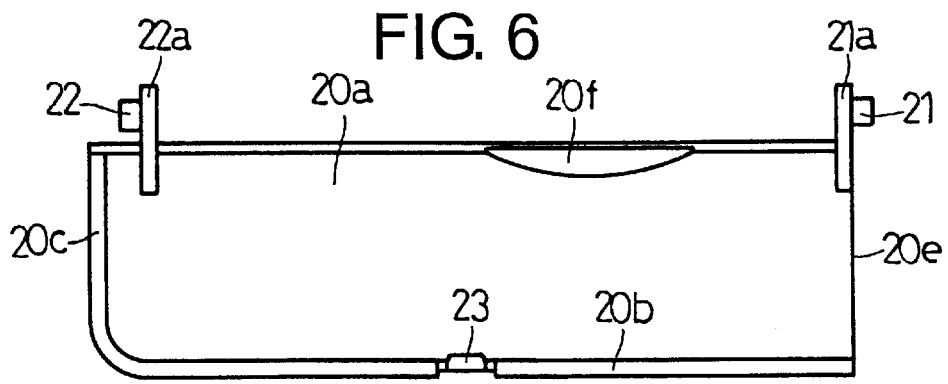
FIG. 6 is a bottom view of the cover.
Figure 7A:
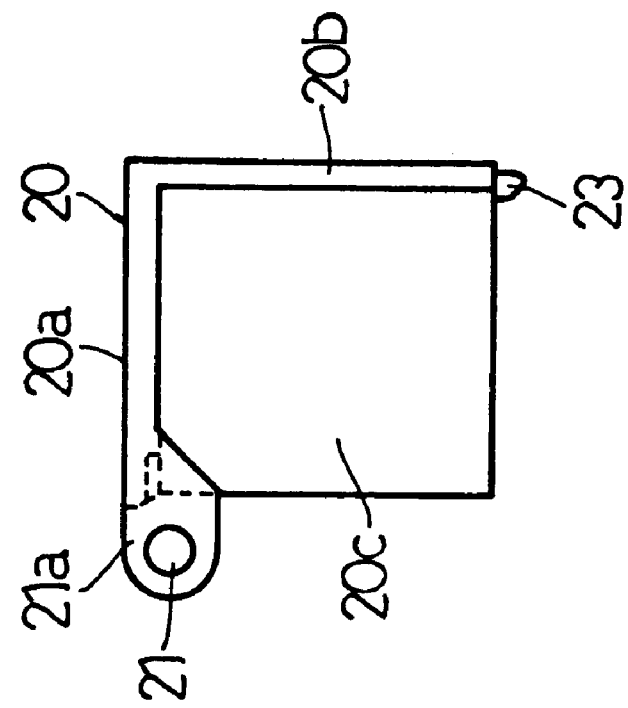
FIG. 7(a) is a right side view.
Figure 7B:
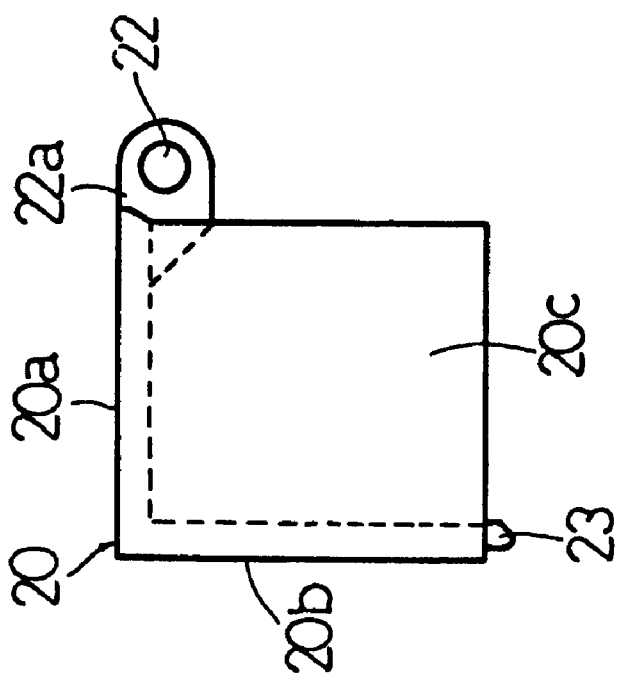
FIG. 7(b) is a left side view.

A cassette tape of this kind has a brake to prevent idle running of the reels. This is true of the present invention, but the reduced tape winding diameter allows the tip of a brake arm 25 to extend toward the reel, thereby providing an appropriate braking effect despite the amount of tape. See FIG. 3. Reference numeral 26 designates a support shaft of the brake arm 25, and 27 denotes an elastic means consisting of a spring that urges the brake arm 25 in an operating direction.

In the VTR cassette tape according to the present invention having the above configuration, notches 28, 29 are provided in the upper part 10a to receive the arms 21a, 22a in order to journal the cover 20. Thus, a window section is eliminated on the small-diameter reel side, whereas it remains as it is on the existing reel side, thereby allowing the upper part 10a except for the window section to be used as an area 31 to which a label 30 is attached.

The small article M is totally arbitrarily selected. The small article M may be, for example, a three-dimensional object such as a miniature doll, animal, or toy, or printed matter such as a card or a miniature book, or any other small object. If, however, the contents of the cassette tape are an animation film, a preferred application of the present invention is to accommodate a character doll such as the leading character of this film, in the accommodation section 17 as the small article M. This provides the synergetic effect of the combination of the video contained in the tape and the small article M symbolic of this video and enables the small article M to be sold with the video tape.

EFFECTS OF THE INVENTION

Despite the small length of the tape, the above configuration and operation of the present invention enable the space inside the cassette body to be used as the accommodation section for the small article, and allows the small article to be housed in and removed from this accommodation section. In particular, the present invention enables the support shafts and the hook to be integrated with the cover to allow the two parts, that is, the cassette body and the cover, to constitute the entire tape, thereby providing a significantly efficient configuration without affecting the operation. Since the cover closing operation agrees with the VTR cassette tape insertion direction, the tape can be perfectly inserted even if the cover is half open. In addition, the attraction of products or services can be enhanced using the present invention for their sales promotion.

What is claimed is:

1. A VTR cassette tape comprising a cassette body having an upper and lower part, two reels, and an accommodation section for accommodating a small article therein, the reels and the accommodation section provided inside the cassette body, wherein the accommodation section for accommodating the small article therein is shaped like a recess and set at an end on a rear surface relative to a front surface from which a tape between the reels can be exposed, wherein a cover enclosing the accommodation section allows the external shape of the cassette body comprising the upper and lower parts to remain almost the same as the original shape, the cover being journaled into the upper part of the cassette body so as to open the accommodation section when rotated upward, and wherein a hook section detachably hooks the cover to the lower part of the cassette body so as to rotate and close the cover.

2. The VTR cassette tape described in claim 1, wherein the cover is journaled into the cassette body by lateral support shafts provided on a right and a left arm, and wherein notches that receive these arms are provided in the upper part of the cassette body.

3. The VTR cassette tape described in claim 1, wherein one of two reels has a smaller diameter, and wherein a window section for allowing the tape wound around the smaller diameter reel to be visually checked is eliminated, while a similar window section on a larger-diameter reel side remains as it is, in order to provide an area in the top surface of the cassette body to which a label is attached.

* * * * *